(12) United States Patent
Wang et al.

(10) Patent No.: US 6,759,166 B2
(45) Date of Patent: Jul. 6, 2004

(54) ALKALINE CELL WITH IMPROVED CATHODE

(75) Inventors: Francis Wang, Newtown, CT (US); Cahit Eylem, New Fairfield, CT (US); Jiayu Simon Xue, Brookfield, CT (US); Kirakodu S. Nanjundaswamy, New Milford, CT (US); James Rozelle, Fairfield, CT (US)

(73) Assignee: The Gillette Company, Boston, MA (US)

( * ) Notice: Subject to any disclaimer, the term of this patent is extended or adjusted under 35 U.S.C. 154(b) by 232 days.

(21) Appl. No.: 10/139,417

(22) Filed: May 6, 2002

(65) Prior Publication Data

US 2003/0207173 A1 Nov. 6, 2003

(51) Int. Cl.[7] .......................... H01M 4/34; H01M 4/42; H01M 4/54
(52) U.S. Cl. .................. 429/219; 429/220; 429/229; 429/232
(58) Field of Search .......................... 429/219, 220, 429/229, 232, 206

(56) References Cited

U.S. PATENT DOCUMENTS 5,516,604 A   5/1996   Mieczkowska

OTHER PUBLICATIONS

Linden. Handbook of Batteries, 2nd edition, pp. 7.11–7.13. 1995, (no month).*

K. Adelsberger, J. Curda, S. Vensky, M. Jansen, Journal of Solid State Chemistry, vol. 158, p. 82–86 (2001).

J. Curda, W. Klein, and M. Jansen, Journal of Solid State Chemistry, vol. 162, p. 220–224 (2001).

* cited by examiner

Primary Examiner—Patrick J. Ryan
Assistant Examiner—Tracy Dove
(74) Attorney, Agent, or Firm—Barry D. Josephs; Paul I. Douglas; Thomas G. Krivulka

(57) ABSTRACT

An alkaline cell having an anode comprising zinc, an alkaline electrolyte solution, a separator, and a cathode comprising silver copper oxide $AgCuO_2$, or $Ag_2Cu_2O_3$, desirably in admixture with $MnO_2$. The cathode preferably also includes a graphitic carbon to improve electrical conductivity. The graphtic carbon can comprise natural or synthetic graphites including expanded graphites and graphitic carbon fibers. The carbon nanofibers desirably have a mean average diameter less than 500 nanometers.

31 Claims, 2 Drawing Sheets

ALKALINE CELL WITH IMPROVED CATHODE

FIELD OF THE INVENTION

This invention relates to an aqueous alkaline cell with a cathode mixture comprising silver copper oxide comprising silver copper oxide $AgCuO_2$ or $Ag_2Cu_2O_3$ or mixtures thereof, also mixtures of such silver copper oxide with manganese dioxide.

BACKGROUND OF THE INVENTION

Conventional alkaline electrochemical cells have an anode comprising zinc and a cathode comprising manganese dioxide. The cell is typically formed of a cylindrical casing. The casing is initially formed with an enlarged open end and opposing closed end. After the cell contents are supplied, an end cap with insulating plug is inserted into the open end. The cell is closed by crimping the casing edge over an edge of the insulating plug and radially compressing the casing around the insulating plug to provide a tight seal. A portion of the cell casing at the closed end forms the positive terminal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. (The term "anode active material" or "cathode active material" as used herein shall be understood to mean material in the anode or cathode, respectively, which is capable of under going electrochemical reaction during cell discharge.) The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, polymeric binders, and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable since it has a high density and high purity. The resistivity of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite. The resistivity of graphites such as flaky natural or expanded graphites can typically be between about $3 \times 10^{-3}$ ohm-cm and $4 \times 10^{-3}$ ohm-cm.

It is desirable for a primary alkaline battery to have a high discharge capacity (i.e., long service life). Since commercial cell sizes have been fixed, it is known that the useful service life of a cell can be enhanced by packing greater amounts of the electrode active materials into the cell. However, such approach has practical limitations such as, for example, if the electrode active material is packed too densely in the cell, the rates of electrochemical reactions during cell discharge can be reduced, in turn reducing service life. Other deleterious effects such as cell polarization can occur as well. Polarization limits the mobility of ions within both the electrolyte and the electrodes, which in turn degrades cell performance and service life. Although the amount of active material included in the cathode typically can be increased by decreasing the amount of non-electrochemically active materials such as polymeric binder or conductive additive, a sufficient quantity of conductive additive must be maintained to ensure an adequate level of bulk conductivity in the cathode. Thus, the total active cathode material is effectively limited by the amount of conductive additive required to provide an adequate level of conductivity.

It is desirable that the cell have high service life under normal drain rates, for example, between about 50 milliAmp and 500 milliAmp and also perform well in higher power application, at current rates between about 0.5 and 2.0 Amp, for example, between about 0.5 Amp and 1.5 Amp. Such high power application corresponds to a power output between about 0.5 and 1.5 Watt or even higher up to about 2.0 Watt. In conventional zinc/$MnO_2$ cells the utilization of anode/cathode active materials falls off as the current drain or power output requirements move into the high power regime.

Although such alkaline cells are in widespread commercial use there is a need to improve the cell or develop a new type of cell that exhibits reliable performance and longer service life for normal applications such as flashlight, radio, audio recorders and portable CD players and desirably also performs even better than conventional zinc/$MnO_2$ cells in high power applications.

SUMMARY OF THE INVENTION

The invention is directed to a primary (nonrechargeable) electrochemical alkaline cell having an anode comprising zinc and a cathode mixture comprising silver copper oxide selected from the compounds $AgCuO_2$ or $Ag_2Cu_2O_3$ or any mixture of $AgCuO_2$ and $Ag_2Cu_2O_3$. The invention is also specifically directed to a primary (nonrechargeable) electrochemical alkaline cell having an anode comprising zinc and a cathode mixture comprising silver copper oxide selected from the compounds $AgCuO_2$ or $Ag_2Cu_2O_3$ or any mixture of $AgCuO_2$ and $Ag_2Cu_2O_3$ wherein said silver copper oxide is admixed with manganese dioxide, preferably electrolytic manganese dixoide (EMD). The term "silver copper oxide" as used herein, unless otherwise specified shall be understood to mean the compounds $AgCuO_2$, $Ag_2Cu_2O_3$ or mixtures thereof. The anode and cathode include an aqueous alkaline solution, preferably aqueous KOH solution. Such cell of the invention can be conveniently referenced herein as a Zn/Silver copper oxide alkaline cell.

The silver copper oxide ($AgCuO_2$ or $Ag_2Cu_2O_3$ or mixtures thereof) employed in the cathode is preferably in the form of a powder having an average particle size between about 1 and 100 micron. The cathode mixture includes a conductive material such as flaky crystalline natural graphite or flaky crystalline synthetic graphite including expanded graphite and graphitic carbon nanofibers. The term graphitic carbon nanofibers as used herein shall mean graphitic carbon fibers having a mean average diameter less than 1000 nanometers (less than $1000 \times 10^9$ meter). The term "average" or "mean average" as used herein shall mean the "arithmetic mean average" unless otherwise specified.) Preferably, the graphitic carbon nanofibers have a mean average diameter less than 500 nanometer, more preferably less than 300 nanometers. Desirably the graphitic carbon nanofibers have a mean average diameter between about 50 and 300 nanometers, typically between about 50 and 250 nanometers. The cathode mixture includes an aqueous KOH solution, desirably having a concentration of between about 30 and 40 percent by weight, preferably between 35 and 45 percent weight KOH in water.

It has been determined that in the Zn/Silver copper oxide alkaline cell of the invention the anode can comprise conventional gelled zinc anode compositions as in commercial use in conventional zinc/$MnO_2$ alkaline cells. By way of an example, not intended to be restrictive, the cathode can comprise the same composition as conventional cathode comprising $MnO_2$ as used in commercial zinc/MnO2 alkaline cells, except that the $MnO_2$ can be replaced in whole or in part by the $AgCuO_2$ or $Ag_2Cu_2O_3$ compounds, or any mixture of $AgCuO_2$ and $Ag_2Cu_2O_3$ compounds herein disclosed. The $AgCuO_2$ has been determined to have advantages when used as a cathode in alkaline cells. The copper in $AgCuO_2$ has a +3 valence and the silver a +1 valence. The $Cu^{+3}$ and $Ag^{+1}$ are available for reduction to copper metal and silver metal during discharge. As a result the $AgCuO_2$ has a high theoretical specific capacity, namely, 526 milliAmp-hour/g. This is much higher than the theoretical specific capacity of $MnO_2$, which is 308 milliAmp-hour/g and higher than the theoretical specific capacity of AgO, which is 436 milliAmp-hour/g or $Ag_2O$, which is 117 milliAmp-hour/g. Additionally, the presence of silver ($Ag^{+1}$) and ($Cu^{+3}$) in the $AgCuO_2$ compound causes an elevation in a $Zn/AgCuO_2$ alkaline cell's running voltage profile as compared to a $Zn/MnO_2$ or Zn/CuO alkaline cell. $Ag_2Cu_2O_3$ has copper at valence at +2 ($Cu^{+2}$) which is lower than copper at valence +3 ($CU^{+3}$) in the $AgCuO_2$ compound, and therefore, has a theoretical specific capacity of 412 milliAmp-hour/g, which is lower than the specific capacity of 526 milliamp-hour/g for the $AgCuO_2$. Nevertheless, the $Ag_2Cu_2O_3$ has a high percent utilization during discharge resulting in high actual capacity as well as high energy output.

The Zn/Silver copper oxide alkaline cell has a higher running voltage profile and longer service life than Zn/$MnO_2$ cells in normal applications, e.g. at drains rates between about 50 and 600 milliamp. It also exhibits a high rate capability for high power applications, for example, at current drains between about 0.5 and 1.5 Amp or power applications between about 0.5 and 1.5 Watt. For example, at a drain rate of about 1 Amp, between about 75 and 80 percent of the theoretical capacity of the $AgCuO_2$ can be utilized in a $Zn/AgCuO_2$ alkaline cell. The $AgCuO_2$, which has a copper valence of +3 (or $Ag_2Cu_2O_3$) is nevertheless sufficiently stable in water or aqueous KOH electrolyte solution. With respect to $AgCuO_2$, this compound does not react in water or aqueous KOH electrolyte during normal cell storage at room temperature as well as ambient temperatures between about $-29°$ C. and $46°$ C. ($-20°$ F. and $115°$ F.) to cause any significant degradation of the $Cu^{+3}$ valence.

A specific aspect of the invention is directed to utilizing silver copper oxides ($AgCuO_2$, or $Ag_2Cu_2O_3$, or any mixture thereof) in admixture with electrolytic manganese dioxide (EMD) to form cathode active material (silver copper oxide plus $MnO_2$) for alkaline cell cathodes. The silver copper oxide can be advantageously added so that it forms any portion of the cathode active material for alkaline cell cathodes. For example, the silver copper oxide can form 100% of the cathode active material in which case there is no $MnO_2$ present in the cathode mixture. In the other extreme the silver copper oxide can be added to $MnO_2$ so that it comprises as little as between about 0.1 and 1.0 percent by weight of the total cathode active material (Silver copper oxide plus MnO2). In this regard the silver copper oxide ($AgCuO_2$ or $Ag_2Cu_2O_3$ or mixtures thereof) can be admixed into particulate manganese dioxide so that the silver copper oxide comprises as little as 0.1 percent by weight or even lower of the total cathode active material (silver copper oxide plus $MnO_2$). The $AgCuO_2$ in admixture with $MnO_2$ desirably comprises between about 3 and 15 percent by weight of the total cathode active material (silver copper oxide plus $MnO_2$) in alkaline cell cathodes.

In one aspect the alkaline cell of the invention has an anode comprising zinc and a cathode mixture comprising silver copper oxide in the form $AgCuO_2$ in admixture with $MnO_2$. The $MnO_2$ is preferably electrolytic $MnO_2$ (EMD). Such cell, for example an AA size cell, exhibits high capacity (mAmp-hrs) and high energy output (mWatt-hours) under discharge rates between about 500 and 1000 mAmp when compared to same size conventional alkaline cell having an anode comprising zinc and cathode comprising manganese dioxide. This advantage would also apply to other size cylindrical cells, for example, AAAA, AAA, C and D size cells as well as AA cells.

In another aspect the alkaline cell of the invention has an anode comprising zinc and a cathode mixture comprising silver copper oxide in the form of $Ag_2Cu_2O_3$ in admixture with $MnO_2$. The $MnO_2$ is preferably in the form of electrolytic manganese dioxide (EMD). Such cell, for example, an AA size cell, exhibits high capacity (mAmp-hrs) and high energy output (mWatt-hours) under discharge rates between about 500 and 1000 mAmp when compared to same size conventional alkaline cell having an anode comprising zinc and cathode comprising manganese dioxide. This advantage would also apply to other size cylindrical cells, for example, AAAA, AAA, C and D size cells as well as AA cells.

In another aspect, the silver copper oxide (AgCuO2, or $Ag_2Cu_2O_3$ or mixtures thereof) comprises between about 82 and 90 percent by weight of the cathode mixture. In such embodiment the silver copper oxide can replace all of the manganese dioxide in the cathode. The performance of conventional Zn/MnO2 alkaline cells can also be improved if the silver copper oxide is used to replace a portion of the amount of $MnO_2$ conventionally used in the alkaline cell cathode as above described. In either case, whether the silver copper oxide is used alone or in admixture with $MnO_2$, the graphitic conductive material in the cathode, desirably comprises between about 2 and 10 percent by weight of the cathode, preferably between about 4 and 10 percent by weight of the cathode. The graphitic conductive material desirably comprises expanded graphite or natural graphite alone or in any mixtures thereof. In such case the graphitic conductive material comprises between about 2 and 10 percent by weight of the cathode, desirably between about 4 and 10 percent by weight of the cathode. The graphitic conductive material can contain only expanded graphite or only natural graphite or only graphitic carbon nanofibers, but can also contain natural graphite, expanded graphite and graphitic carbon nanofibers in any combination or mixture thereof. In such case the graphitic conductive material desirably comprises between about 4 and about 10 percent by weight of the cathode. The aqueous KOH solution desirably comprises between about 5 and 10 percent by weight of the cathode mixture. The aqueous KOH solution itself desirably comprises between about 30 and 40 percent by weight KOH, preferably between about 35 and 40 percent by weight KOH and about 2 percent by weight zinc oxide.

DETAILED DESCRIPTION

Figure 1:
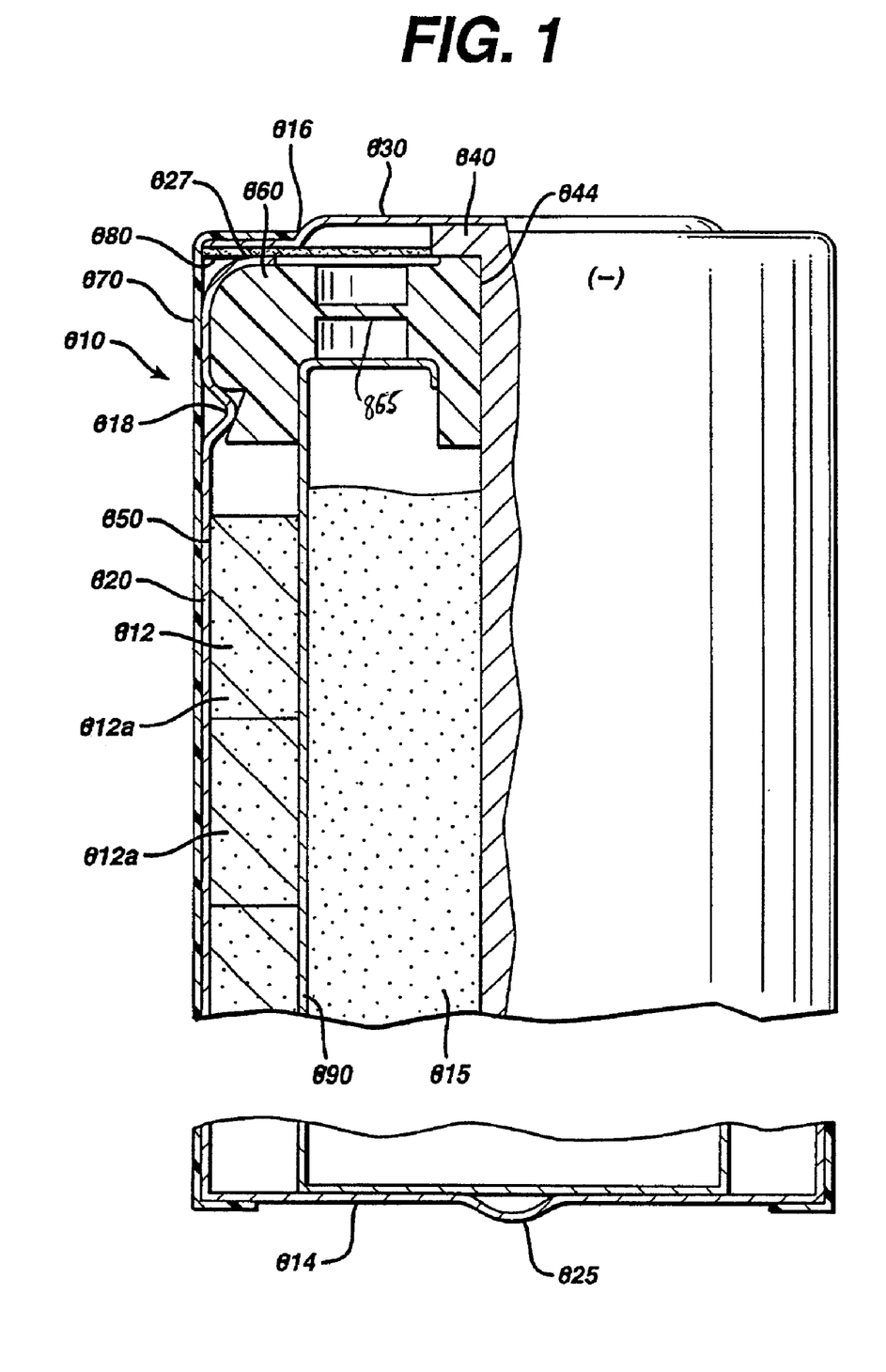
FIG. 1 is a cross sectional cut-away view of an elongated cylindrical alkaline cell having the cathode of the invention.

A representative alkaline cell utilizing the cathode mixture of the invention is shown in FIG. 1. The alkaline cell 810 comprises an elongated cylindrical casing 820 of steel, preferably nickel plated steel, having a closed end 814 and an open end 816. The cell is preferably filled with cathode mixture 812 of the invention comprising silver copper oxide ($AgCuO_2$, $Ag_2Cu_2O_3$ or mixtures thereof) which functions as cathode active material. Desirably the cathode mixture 812 comprises mixtures of MnO2 and silver copper oxide. The cathode active material, preferably in the form of mixtures of MnO2 and silver copper oxide desirably comprises between about 80 and 90 percent by weight of the total cathode 812.

In one extreme the silver copper oxide ($AgCuO_2$, $Ag_2Cu_2O_3$ or mixtures thereof) can form 100 wt. % of the cathode active material in which case there is no $MnO_2$ present in the cathode mixture. In the other extreme the silver copper oxide can be added in admixture with $MnO_2$ so that it comprises as little as 1.0 percent by weight of the total cathode or even as little as about 0.1 percent by weight (or even lower amount) of the total cathode active material ($AgCuO_2$ plus $MnO_2$). Thus, any mixture of silver copper oxide and MnO2 between these two extremes is possible and is within the scope of the present invention. Thus, the cathode mixture 812 may have the silver copper oxide added in amount comprising between about 0.1 and 100 percent by weight of the total cathode active material. (The cathode active material is the material in the cathode which can undergo electrochemical reaction during cell discharge.) It has been determined advantageous to form a cathode mixture 812 by admixing $AgCuO_2$ with $MnO_2$ and adding graphite or graphitic carbon and alkaline electrolyte solution, preferably aqueous potassium hydroxide. In such cathode mixture 812 the $AgCuO_2$ desirably comprises between about 3 and 20 percent by weight of the total mixture.

The copper in the compound $AgCuO_3$ has a +3 valence and the silver a +1 valence. The $Cu^{+3}$ and $Ag^{+1}$ is available for reduction to copper metal and silver metal during cell discharge. As a result the $AgCuO_2$ has a high theoretical specific capacity, namely, 526 milliAmp-hour/g. (This is calculated as follows: 1 electron has the charge of $1.602 \times 10^{-19}$ coulomb. Based on Avogadro's number there are $6.023 \times 10^{23}$ molecules per mole. 1 coulomb=1 Amp-sec. Assume theoretical reduction of the $AgCuO_2$ molecule during cell discharge on the basis of 4 electrons per molecule. Then, the theoretical capacity, milli-Amp per mol of $AgCuO_2$, is 4 electrons/molecule×$6.023 \times 10^{23}$ molecules/mol×$1.602 \times 10^{-19}$ coulomb/electron=$4 \times 9.649 \times 10^4$ coulomb/mol or $4 \times 9.649 \times 10^4$ Amp-sec/mol. The molecular weight of $AgCuO_2$ is 203.5. Thus, the theoretical capacity of $AgCuO_2$ is $4 \times 9.649 \times 10^4$ Amp-sec/mol×1 hour/3600 sec×1 mol/203.5 g=0.526 Amp/g=526 milliAmp/g. The compound $Ag_2Cu_2O_3$ has a lower theoretical specific capacity of about 412 mAmp-hr/g.

The cathode mixture 812 contains a conductive material, preferably a graphitic conductive material such as flaky crystalline natural graphite or flaky crystalline synthetic graphite, preferably expanded graphites or graphitic carbon nanofiber and mixtures thereof.

The term "graphite" or "graphitic material" as used herein shall include natural and synthetic crystalline graphites, expanded graphites, graphitic carbons, and graphitic carbon fibers. A graphitic carbon has the characteristics of an ordered three-dimensional graphite crystalline structure consisting of layers of hexagonally arranged carbon atoms stacked parallel to each other as determined by X-ray diffraction. As defined in International Committee for Characterization and Terminology of Carbon (ICCTC, 1982), published in the *Journal Carbon*, Vol. 20, p. 445 a graphitic carbon embraces the varieties of substances consisting of elemental carbon in allotropic form of graphite irrespective of of structural defects. The term graphitic carbon as used herein shall be construed in this manner.

The term carbon fibers shall mean elongated strands of carbon having length to diameter ratio greater than 4, typically greater than 8. The length to diameter ratio of carbon fibers can be much higher, for example, greater than 100 or more. The term "natural crystalline graphite" as used herein shall mean graphite that is minimally processed, i.e., essentially in its geologically occurring natural crystalline form. The term "synthetic graphite" as used herein shall mean synthetically prepared or processed graphite. The term "synthetic graphite" as used herein unless further qualified is also intended to include expanded forms of graphite (including expanded graphite that has been exfoliated) and graphitic carbon nanofibers. The term "expanded graphite" is a recognized term of art, for example, the form of graphite generally as referenced in U.S. Pat. No. 5,482,798. Further, expanded graphite as used herein can be formed from natural and/or synthetic non-expanded graphite processed so as to have a uniaxially expanded crystal lattice. The extent of uniaxial expansion can be sufficiently large such that the expanded graphite particles can completely exfoliate (i.e., separate into thin laminae). The term "flaky" as commonly used in connection with graphites, (i.e., natural or synthetic flaky graphites) is intended to reflect that such graphites have a plate-like, non-expanded particle form.

The graphitic conductive material is added to the $AgCuO_2$ active material to form the cathode of the invention. The graphitic conductive material desirably comprises between about 2 and 10 percent by weight of the cathode mixture, preferably between about 4 and 10 percent by weight of the cathode. The graphitic conductive material desirably comprises expanded graphite or natural graphite alone or in any mixtures thereof. In such case the graphitic conductive material comprises between about 2 and 10 percent by weight of the cathode, desirably between about 4 and 10 percent by weight of the cathode. The graphitic conductive material can contain only expanded graphite or only natural graphite or only graphitic carbon nanofibers, but can also contain natural graphite, expanded graphite and graphitic carbon nanofibers in any combination or mixture thereof. In such case the graphitic conductive material desirably comprises between about 4 and about 10 percent by weight of the cathode. The aqueous KOH solution desirably comprises between about 5 and 10 percent by weight of the cathode mixture. It has been determined that expanded graphite provides a desirable graphitic conductive material when used alone or in admixture with natural graphite to be added to the $AgCuO_2$ cathode active material. However, the graphitic carbon nanofibers can also be added to form a portion of the graphitic conductive material as above mentioned. Such graphitic carbon nanofibers, per se, are referenced in the published art and specific methods of manufacture are disclosed, for example, in U.S. Pat. Nos. 5,594,060; 5,846,509 and 6,156,256.

The term graphitic carbon fibers as used herein shall mean carbon fibers having a graphitic carbon structure as defined by the International Committee for Characterization and Terminology of Carbon (ICCTC, 1982), published in the *Journal Carbon*, Vol. 20, p. 445. The graphitic carbon nanofibers as used herein shall mean graphitic carbon fibers having a mean average diameter less than 1000 nanometers (less than $1000 \times 10^{-9}$ meters). (The term "average" or "mean average" as used herein, unless otherwise specified, shall be understood to mean the arithmetic mean average.) Preferably, the graphitic carbon nanofibers have a mean average diameter less than 500 nanometer, more preferably less than 300 nanometers. Desirably the graphitic carbon nanofibers have a mean average diameter between about 50 and 300 nanometers, typically between about 50 and 250 nanometers. The graphitic carbon nanofiber useful in the cathode mixture 812 of the invention has a mean average diameter desirably less than about 300 nanometers, preferably between about 50 and 250 nanometers, typically about 200 nanometers. The mean average length of the carbon nanofibers is desirably between about 0.5 and 300 micron, typically about 200 micron. The graphitic carbon nanofibers can have a BET surface area between about 15 and 50 $m^2/g$, typically between 15 and 30 $m^2/g$. Such graphitic carbon nanofibers can be in the form of individual fiber strands including agglomerates of such fiber strands. A preferred graphitic carbon nanofiber for use in the cathode mixture 812 of the invention is a vapor grown graphitic carbon fiber available under the trade designation PR19HT carbon fibers from Applied Sciences, Cedarville, Ohio. Such graphitic carbon nanofibers can be made by hydrocarbon vapor pyrolysis methods described, for example, in Applied Sciences U.S. Pat. No. 6,156,256; 5,846,509; and 5,594,060 herein incorporated by reference. The resulting carbon nanofibers have a graphitic carbon structure as defined in International Committee for Characterization and Terminology of Carbon (ICCTC, 1982), published in the *Journal Carbon*, Vol. 20, p. 445. The vapor grown carbon fibers described in the above patent references are graphitic carbon fibers which can be made by the pyrolysis of hydrocarbon, for example, methane in a gas phase reaction at temperatures of around 1000° C. or higher. The gas phase reaction involving the hydrocarbon is carried out upon contact with metal particles, typically iron particles in a nonoxidizing gas stream. The iron particles catalyze the growth of very thin individual carbon fibers (e.g. carbon nanofibers) which have a graphitic carbon structure. The resulting carbon fibers can have a very thin diameter (nanofibers), for example, between 50 and 300 nanometers such as that available under the trade designation PR19HT graphitic carbon nanofibers (Applied Sciences).

It has been determined that the iron (or other metal) impurity which are residual catalyst impurities imbedded in the graphitic carbon nanofiber can be readily removed therefrom by subjecting the nanofibers to heating at temperatures between about 2500° C. and 3100° C. after the fibers have been formed. Such heating vaporizes the metal impurities and can also serve to further graphitize the carbon fiber, particularly the surface of the fibers. The end result is a purified graphitic carbon nanofiber desirably contains less than 200 ppm, preferably less than 100 ppm, more preferably less than 50 ppm metal. (The term metal shall include all metal whether in elemental, ionic or chemically bound in compounds.) Such graphitic carbon nanofiber can form a portion of the graphitic carbon material to be added to the $AgCuO_2$ cathode active material. For example, such graphitic carbon nanofiber can be admixed with natural graphite or expanded graphite as above mentioned.

The cathode mixture 812 comprising $AgCuO_2$ and graphite material or mixtures of $AgCuO_2$ and $MnO_2$ and graphite material can be prepared wet by blending an aqueous KOH electrolyte solution into the mixture before the mixture is inserted into the cell. For example, the casing 820 can be filled with the wet cathode mixture and the central portion of the cathode mixture can be excavated leaving the annular cathode 812 as shown in FIG. 1. The wet cathode mixture can be compacted while in the cell. Alternatively, the wet mixture can be compacted into disks 812a before insertion into the cell and then, optionally, additionally compacted while in the cell. Alternatively, the cathode mixture 812 can be prepared by first dry mixing the $AgCuO_2$, $MnO_2$ and graphite material. The dry mixture can be compacted into the cell casing 820 or can be compacted into disk shaped blocks 812a, which can be inserted into the cell in stacked arrangement. A separator sheet 890 can be placed against the inside surface of cathode disks 812a. Separators conventionally used in zinc/$MnO_2$ alkaline cells can be used for separator 890 in the present cell 810 having a cathode 612 comprising silver copper oxide. Separator 890 can be of cellulosic film or a film formed of nonwoven material comprising polyvinylalcohol and rayon fibers. Separator 890 can be of a single layer of such nonwoven material or can be a composite having a layer of cellophane adhered to the nonwoven material. The nonwoven material can typically contain polyvinylalcohol fibers and rayon fibers. Separators conventionally used in zinc/silver oxide alkaline cells can be used advantageously for separator 890 in the present cell 810 having a cathode 812 comprising silver copper oxide. Separator 890 can be prepared from a radiation graft of methacrylic acid onto a polyethylene membrane. Separator 890 in such form retards the migration of copper and silver ions to the anode compartment. Separator 890 can be positioned so that the cellophane layer is adjacent to either cathode 812 or anode 815. $AgCuO_2$ has a slight solubility (e.g. less than about 1 weight percent) in aqueous potassium hydroxide. Thus, a small amount of the silver and copper ions from $AgCuO_2$ are present in solution within the aqueous potassium hydroxide electrolyte present in the cathode mixture 815. The grafted separator is particularly desirable since it tends to retard migration of silver and copper ions from the cathode to the anode. Aqueous KOH electrolyte can be poured over the dry cathode wherein it becomes absorbed into the separator and cathode. The anode material 815 can then be added to the cell.

The silver copper oxide ($AgCuO_2$) can be prepared by the reaction between a silver nitrate ($AgNO_3$) and copper nitrate, ($CuNO_3$) utilizing an oxidizing solution of KOH and a catalyst such as $K_2S_2O_8$ with the reaction carried out at about 90° C. temperature. A method of synthesis according to the above reaction is described in J. Curda, W. Klein, and M. Jansen, "$AgCuO_2$ Synthesis, Crystal Structure, . . . ", *Journal of Solid State Chemistry*, Vol. 162, pp. 220–224 (2001). Specifically, as stated in the above reference, microcrystalline $AgCuO_2$ can be synthesized by reacting saturated aqueous solution of 1.205 g (5 mMol) of $AgNO_3$ (Merck, 99%) and 0.85 g (5 mMol) of $Cu(NO_3)_2.3H_2O$ by adding a solution of 3.0 g of KOH and 1.5 g of $K_2S_2O_8$ in 150 ml of water at 90° C. The microcystalline $AgCuO_2$ forms as a precipitate. The unique microcystalline structure of the $AgCuO_2$ is illustrated in FIG. 6 of the above reference. The $AgCuO_2$ precipitate is filtered off, washed with deionized water and dried in air at 70° C. Another means of forming $AgCuO_2$ (alluded to in the above reference) is by oxidation of an aqueous suspension of $Ag_2Cu_2O_3$ as reported in the reference K. Adelsberger, J. Curda, S. Vensky, and M. Jansen, *J. Solid State Chem.*, Vol. 158, p. 82–86 (2001). A method of preparing $Ag_2Cu_2O_3$ is given in K. Adelsberger et. al., supra, *J. Solid State Chem.*, Vol. 158, at p. 82, as follows: "Black crystals of $Ag_2Cu_2O_3$ can be prepared by solid state reaction of $Ag_2O$ (precipitated from an acidic $AgNO_3$ solution) and CuO (Aldrich, 99%) in a high oxygen pressure. The binary oxides can be mixed in a 1:1 molar ratio and then annealed for 3–5 days in silver crucibles placed in stainless steel autoclaves. The optimized reaction temperature and pressure are 500° C. and 200 Mpa, respectively. One milliliter of a 7 M KOH aqueous solution is added as an accelerator. Microcrystalline, black powder of $Ag_2Cu_2O_3$ is precipitated from an aqueous solution of $AgNO_3$ (Merck, p.a., 99.5%) and $CuNO_3.3H_2O$ (Panreac, p.a., 99.98%) adding 4 ml NaOH solution (3M). The precipitate is dried in air at 90° C. for 24 hours."

The silver copper oxide prepared as given above can be used in cathode mixture 812. The silver copper oxide for use in cathode 812 is a powder having an average particle size (dry) between about 1 and 100 micron. The silver copper oxide, $AgCuO_2$, has a real density of about 7.1 g/cc and a BET surface area of about 10–100 $m^2/g$, for particles sizes between about 1 and 100 micron. The $Ag_2Cu_2O_3$ has a real density of about 7.0 g/cc. The real density of a solid is the weight of the sample divided by the real volume. The real volume of a sample is the actual volume less volume occupied by entrapped air between the particles and pores within the particles. The BET surface area ($m^2/g$) (Brunauer, Emmett and Taylor method) is the standard measurement of particulate surface area by gas (nitrogen and/or other gasses) porosimetry as is recognized in the art. The BET surface area measures the total surface area on the exterior surface of the particle and also that portion of surface area defined by the open pores within the particle available for gas adsorption and deadsorption when applied.

Anode 815 comprises zinc and aqueous KOH electrolyte. The electrolyte in the anode comprises a conventional mixture of KOH, ZnO and gelling agent. The zinc serves as the anode active material. The anode and cathode can be separated by a conventional ion porous separator 890, for example, comprising polyvinylalcohol and cellulosic fibrous material. After cell 810 is filled an insulating plug 860 is inserted into open end 816. Insulating plug 860 may be of polypropylene, talc filled polypropylene, sulfonated polyethylene or nylon. Plug 860 can have a thinned portion 865 therein typically of a small circular, oval or polygonal shape. Thinned portion 865 functions as a rupturable membrane which can be designed to rupture thereby releasing excessive gas within the cell. This guards against excessive buildup of gas pressure within the cell, for example, if the cell is subjected to excessive heat or abusive operating conditions. The plug 860 is preferably snap fitted around circumferential step 818 as shown in the figure so that the plug locks in place into the open end 816. The peripheral edge 827 of casing 820 is crimped over the top of insulating plug 860. A paper insulating washer 880 is applied over the crimped peripheral edge 827 of casing 820. Insulating washer 880 can be a polyethylene coated paper washer. A terminal end cap 830 is welded to the head of current collector 840. An elongated current collector 840 is then inserted (force fitted) into aperture 844 of insulating plug 860 so that end cap 830 comes to rest against insulating washer 880. Current collector 840 can be selected from a variety of known electrically conductive metals found to be useful as current collector materials, for example, brass, tin plated brass, bronze, copper or indium plated brass. The current collector 840 used in the test cells was of brass. Conventional asphalt sealant may be preapplied around the current collector 840 before it is inserted into aperture 844. A film label 870 is applied around casing 820. The terminal end cap 830 becomes the negative terminal of alkaline cell 810 and pip 825 at the closed end of casing 820 becomes the positive terminal.

The cell 810 shown in FIG. 1 can be an AA cell. However, the alkaline cell shown in the figure is not intended to be restricted to any particular size. Thus, the present invention is applicable to AAAA, AAA, C and D size cylindrical alkaline cells as well as button size or prismatic alkaline cells of any size or shape. Alkaline cell 810 is not intended to be restricted to any particular cell chemistry or cell size, except that the cathode 812 is prepared utilizing the cathode mixture of invention comprising silver copper oxide and graphite material. The above cell (FIG. 1) can be an AAAA, AAA, AA, C or D cells. These standard cell sizes are recognized in the art and are set by the American National standards Association or in Europe by the International Electrotechnical Commission (IEC). The AA cylindrical cell as referenced herein had standard overall dimensions as given by the American National Standards Institute (ANSI) battery specification ANSI C18.1M, Part 1-1999 as follows: The overall length from positive and negative terminal tips is between 49.2 mm and 50.5 mm and overall outside cell diameter is between 13.5 mm and 14.5 mm.

Thus cell 810 can contain conventional alkaline cell zinc anode chemistries including those which contain zero added mercury (less than 50 parts mercury per million parts total cell weight, preferably less than 10 parts mercury per million parts total cell weight) and modifications thereof. Such representative chemistries, for example, are disclosed in U.S. Pat. No. 5,401,590, herein incorporated by reference. The cell 810 of the invention also preferably does not contain added amounts of lead and thus can be essentially lead free, that is, the total lead content is less than 30 ppm, desirably less than 15 ppm of total metal content of the anode.

Figure 2:
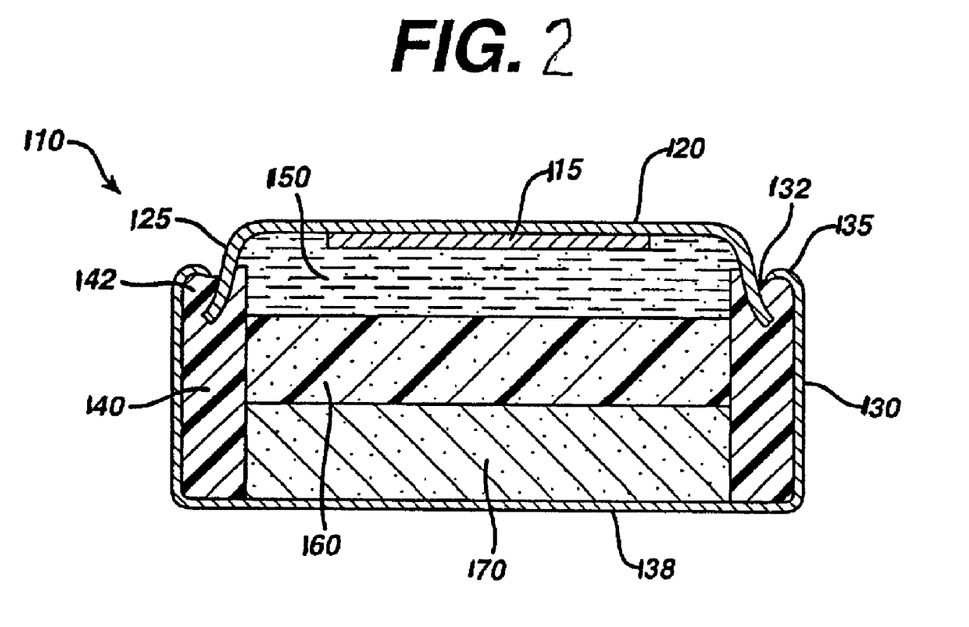
FIG. 2 is a cross sectional view of a cylindrical button alkaline cell having the cathode of the invention.

An alkaline cell having a gelled zinc anode and the cathode of the invention comprising silver copper oxide ($AgCuO_2$, $Ag_2Cu_2O_3$, or mixtures thereof) cathode active material can also be fabricated in the form of a button or coin cell 110 as shown in FIG. 2. The cell 110 can include a cathode 170 comprising the cathode mixture of the invention. The cathode 170 can also include $MnO_2$ blended in with the silver oxide. Such cathode mixtures, can comprise cathode active material silver copper oxide with MnO2 optionally added, total actives 82 to 90 wt. %; graphite, for example, expanded graphite, between about 4 and 10 wt. %; and between about 5 and 10 wt. % of aqueous KOH electrolyte (aqueous KOH electrolyte is 30 to 40 wt. % KOH concentration, preferably between 35 and 40 wt. % KOH concentration). The aqueous KOH electrolyte preferably also contains about 2 wt. % ZnO. The cathode mixture can optionally also comprise between about 0.1 to 0.5 wt % of a polyethylene binder.

The anode material 150 comprises: Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the tradename "CARBOPOL C940" from B. F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode is between about 69.2 and 75.5 percent by volume of the anode. It shall be understood that the term zinc as used herein shall include such zinc alloy powder, since the alloy powder is composed almost entirely of zinc and functions electrochemically as zinc.

The separator 160 can be a conventional ion porous separator as described above with respect to separator 160. In the specific embodiment shown in FIG. 2, referenced in the examples, the separator 160 comprises an inner layer of cellophane and an outer layer of a nonwoven material composed of cellulosic (rayon) and polyvinylalcohol fibers. The inner layer of cellophane abuts the anode 150.

In the button cell 110 shown in FIG. 2, a disk-shaped cylindrical housing 130 is formed having an open end 132 and a closed end 38. Housing 130 is formed from nickel-plated steel. An electrical insulating member 140, preferably a cylindrical member having a hollow core, is inserted into housing 130 so that the outside surface of insulating member 140 abuts and lines the inside surface of housing 130. Alternatively, the inside surface of housing 130 can be coated with a polymeric material that solidifies into insulator 140 abutting the inside surface housing 130. Insulator 140 can be formed from a variety of thermally stable insulating materials, for example, nylon or polypropylene.

The cathode mixture 170 comprising silver copper oxide ($AgCuO_2$, $Ag_2Cu_2O_3$, or mixtures thereof), graphite, aqueous electrolyte can be prepared by simple mixing at ambient temperature in a conventional blender until a homogenous mixture is obtained. The cathode 170 can optionally also include $MnO_2$ blended in with the silver oxide as above described. The graphite can be flaky natural crystalline graphite, flaky crystalline synthetic graphite, expanded graphite or any mixture thereof. The cathode 170 is applied as a layer or a pressed disk abutting the inside surface of the closed end 138 of housing 130. The separator sheet 160 is placed overlying cathode 170. Additional aqueous electrolyte can be added so that electrolyte fully penetrates through separator sheet 160 and cathode 170. A layer of anode mixture 150 comprising particulate zinc, aqueous KOH electrolyte solution (35–40 wt % KOH and 2 wt. % ZnO), and gelling agent is applied to the separator sheet 160. The anode cover 120, formed preferably of nickel-plated steel, is inserted into the open end 132 of housing 130. An anode current collector 115 comprising a sheet of brass, tin-plated brass, bronze, copper or indium-plated brass can optionally be welded to the inside surface of anode cover 120. Peripheral edge 135 of housing 130 is crimped over the exposed insulator edge 142 of insulating member 140. The peripheral edge 135 bites into insulator edge 142 closing housing 130 and tightly sealing the cell contents therein. The anode cover 120 also functions as the negative terminal of the cell and the housing 130 at the closed end 138 functions as the cell's positive terminal.

Test cylindrical button cells 110 can be prepared, for example, having a diameter of 15.0 mm and depth of 6.98 mm.

In test button cells 110 the separator 160 can be a conventional ion porous separator consisting of a layer of a nonwoven material of cellulosic (rayon) and polyvinylalcohol fibers and a layer of cellophane. The same anode mixture comprising particulate zinc can be used in each test cell. The cathode composition can be varied. The performance of the cells, service life (milliamp-hrs) and energy output (milliWatt-hrs) can be determined by discharging at a given current, milliAmp or current density milliAmp/cm2 (current density at anode/cathode interface) to a specific cut off voltage, for example of 0.9 Volts.

In the tests reported in the following examples the test cells were cylindrical button cells 110 of the type shown in FIG. 2. The button cells were 635 size cells having a diameter of 15 mm and thickness of 6.98 mm. In the case of the comparative test (Example 1) using an anode comprising zinc and a cathode comprising $MnO_2$, the button cells 110 were balanced on the basis that milliamp-hrs capacity of zinc (based on 810 milliamp-hours per gram zinc) divided by the milliamp-hrs capacity of $MnO_2$ (based on 308 milliamp-hours per gram $MnO_2$) is about 1. In the cells tested (Examples 2–9) using an anode comprising zinc and cathode comprising mixtures of $AgCuO_2$ and MnO2, the AA size cells 810 were balanced on the basis that the milliamp-hrs capacity of zinc (based on 810 milliamp-hours per gram zinc) divided by the theoretical milliamp-hrs capacity of silver copper oxide and MnO2 in the cathode mixture (based on 526 milliAmp-hours per gram $AgCuO_2$, 412 milliAmp-hours per gram $Ag_2Cu_2O_3$ and 308 milliAmp-hours per gram of $MnO_2$) is slightly in excess of 1.

EXAMPLE 1
(Comparative-Zinc Anode; MnO2 Cathode)

Test cylindrical button cells of the general configuration shown in 110 (FIG. 1) were prepared. The cells had a diameter of 15 mm and thickness of 6.98 mm. Test cells 110 were prepared with a anode 150 comprising Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the trade name "CARBOPOL C940" from B. F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode is between about 1.75 and 2.2 grams zinc per cubic centimeter of anode. The percent by volume of the aqueous electrolyte solution in the anode is between about 69.2 and 75.5 percent by volume of the anode. The separator 160 was a conventional dual layered cellulosic separator employing an outer layer comprising rayon and polyvinylalcohol (facing cathode 170) and inner layer of cellophane facing anode 150.

The cathode 170 has the following representative composition: 80–87 wt % of electrolytic manganese dioxide (e.g., Trona D from Kerr-McGee), 4–10 wt % of expanded graphite (Timcal E-BNB90, BET surface of 24.3 m$^2$/g ), 5–10 wt % of an aqueous KOH solution having a KOH concentration of about 35–40 wt. %. Specifically the cathode 170 had 0.55 grams of MnO$_2$ and was balanced with an amount of zinc in anode 150 calculated as above described so that the theoretical capacity of the zinc divided by the theoretical capacity of the MnO$_2$ was about 1. A specific cathode composition which was used for Example 1 is as follows:

| Cathode Composition[1] | |
|---|---|
| | Wt. % |
| MnO$_2$ (EMD) | 87 |
| Expanded graphite (Timcal E-BNB90) | 7 |
| KOH aqueous Solution (36 wt % KOH and 2 wt % ZnO) | 6 |
| | 100 |

Notes:
[1]Conversion to volume percent can be made using the following real densities: MnO$_2$ (EMD), 4.48 g/cc; expanded graphite (Timcal E-BNB90), 2.25 g/cc; and 36 wt % KOH aqueous solution, 1.35 g/cc.

The button cells 110 of Example 1 were discharged at a constant rate of 67 milliAmp (equivalent to a rate of about 750 milliAmp in an AA size cell) to a cut off voltage of 0.9 volts. In separate tests batches of fresh button cells 110 of Example 1 were discharged at a constant rate of 90 milliamp (equivalent to a rate of about 1 Amp in an AA size cell).

At discharge of 67 milliAmp, the capacity obtained at a cut off voltage of 0.9 Volts was 23.5 milliAmp-hrs. The specific capacity of the MnO$_2$ was 43 milliAmp-hours per gram. The energy output of the cell was 23.5 milliWatt-hrs.

At discharge of 90 Amp, the capacity obtained at a cut off voltage of 0.9 Volts was 27.4 milliAmp-hrs. The specific capacity of the MnO$_2$ was 50 milliAmp-hours per gram. The energy output of the cell was 27.4 milliWatt-hrs.

EXAMPLE 2

Test cylindrical button cells 110 were prepared as in Example 1 except that the cathode 170 is formed of the following cathode mixture of the invention comprising silver copper oxide (AgCuO$_2$) and electrolytic manganese dioxide. The anode composition comprising gelled zinc was the same as used in Example 1. The cell was balanced so that the theoretical capacity of the zinc divided by the theoretical capacity of the total of AgCuO$_2$ and MnO2 was about 1. The cathode mixture had about 0.54 grams actives. The total weight percent of active material, namely 87 wt. %, was the same as in Example 1, however the percent by weight of MnO$_2$ was reduced to 84 wt. % and AgCuO$_2$ was added in amount of 3 wt. % to make up the difference.

| Cathode Composition[1] | |
|---|---|
| | Wt. % |
| MnO$_2$ | 84 |
| AgCuO$_2$ | 3 |

| Cathode Composition[1] | |
|---|---|
| | Wt. % |
| Expanded graphite (Timcal E-BNB90) | 7 |
| KOH aqueous Solution (36 wt % KOH and 2 wt. % ZnO) | 6 |
| | 100 |

Notes:
[1]Conversion to volume percent values can be made using the following real densities: AgCuO$_2$, 7.1 g/cc; expanded graphite (Timcal E-BNB90), 2.25 g/cc; and 36 wt % KOH aqueous solution, 1.35 g/cc.

The button cells 110 of this example were discharged at a constant rate of 67 milliAmp (equivalent to a rate of about 750 milliAmp in an AA size cell) to a cut off voltage of 0.9 volts. In separate tests batches of fresh button cells of this example were discharged at a constant rate of 90 milliAmp (equivalent to a rate of about 1 Amp in an AA size cell).

At discharge of 67 milliAmp, the capacity obtained at a cut off voltage of 0.9 Volts was 20.8 milliAmp-hrs. The specific capacity of the AgCuO$_2$ was 38 milliAmp-hours per gram. The energy output of the cell was 20.8 milliWatt-hrs.

At discharge of 90 milliAmp, the capacity obtained at a cut off voltage of 0.9 Volts was 18.1 milliAmp-hrs. The specific capacity of the AgCUO$_2$ was 33 milliAmp-hours per gram. The energy output of the cell was 18.1 milliWatt-hrs.

The performance results of the examples are summarized in Table 1 for discharge at 67 milliAmp and Table 2 for discharge at 90 milliAmp.

EXAMPLE 3

Test cylindrical size button cells 110 were prepared as in Example 1 except that the cathode 170 is formed of the following cathode mixture of the invention comprising silver copper oxide (AgCuO$_2$) and electrolytic manganese dioxide. The anode composition comprising gelled zinc was the same as used in Example 1. The cell was balanced so that the theoretical capacity of the zinc divided by the theoretical capacity of the total of AgCuO$_2$ and MnO2 was about 1. The cathode mixture had about 0.54 grams actives. The total weight percent of active material, namely 87 wt. %, was the same as in Example 1, however the percent by weight of MnO$_2$ was reduced to 81 wt. % and AgCuO$_2$ was added in amount of 6 wt. % to make up the difference.

| Cathode Composition[1] | |
|---|---|
| | Wt. % |
| MnO$_2$ | 81 |
| AgCuO$_2$ | 6 |

-continued

| Cathode Composition[1] | |
|---|---|
| | Wt. % |
| Expanded graphite (Timcal E-BNB90) | 7 |
| KOH aqueous Solution (36 wt % KOH and 2 wt. % ZnO) | 6 |
| | 100 |

Notes:
[1]Conversion to volume percent values can be made using the following real densities: $AgCuO_2$, 7.1 g/cc; expanded graphite (Timcal E-BNB90), 2.25 g/cc; and 36 wt % KOH aqueous solution, 1.35 g/cc.

The button cells 110 of this example were discharged at a constant rate of 67 milliAmp (equivalent to a rate of about 750 milliAmp in an AA size cell) to a cut off voltage of 0.9 volts. In separate tests batches of fresh button cells of this example were discharged at a constant rate of 90 milliAmp (equivalent to a rate of about 1 Amp in an AA size cell).

At discharge of 67 milliAmp, the capacity obtained at a cut off voltage of 0.9 Volts was 49.7 milliAmp-hrs. The specific capacity of the $AgCuO_2$ was 91 milliAmp-hours per gram. The energy output of the cell was 57.1 milliWatt-hrs.

At discharge of 90 milliAmp, the capacity obtained at a cut off voltage of 0.9 Volts was 54.6 milliAmp-hrs. The specific capacity of the $AgCuO_2$ was 100 milliAmp-hours per gram. The energy output of the cell was 52.7 milliWatt-hrs.

The performance results of the examples are summarized in Table 1 for discharge at 67 milliAmp and Table 2 for discharge at 90 Amp.

EXAMPLE 4

Test cylindrical size button cells 110 were prepared as in Example 1 except that the cathode 170 is formed of the following cathode mixture of the invention comprising silver copper oxide ($AgCuO_2$) and electrolytic manganese dioxide. The anode composition comprising gelled zinc was the same as used in Example 1. The cell was balanced so that the theoretical capacity of the zinc divided by the theoretical capacity of the total of $AgCuO_2$ and MnO2 was about 1. The cathode mixture had 0.54 grams actives. The total weight percent of active material, namely 87 wt. %, was the same as in Example 1, however the percent by weight of $MnO_2$ was reduced to 77 wt. % and $AgCuO_2$ was added in amount of 10 wt. % to make up the difference.

| Cathode Composition[1] | |
|---|---|
| | Wt. % |
| $MnO_2$ | 77 |
| $AgCuO_2$ | 10 |

-continued

| Cathode Composition[1] | |
|---|---|
| | Wt. % |
| Expanded graphite (Timcal E-BNB90) | 7 |
| KOH aqueous Solution (36 wt % KOH and 2 wt. % ZnO) | 6 |
| | 100 |

Notes:
[1]Conversion to volume percent values can be made using the following real densities: $AgCuO_2$, 7.1 g/cc; expanded graphite (Timcal E-BNB90), 2.25 g/cc; and 36 wt % KOH aqueous solution, 1.35 g/cc.

The button cells 110 of this example were discharged at a constant rate of 67 milliAmp (equivalent to a rate of about 750 milliAmp in an AA size cell) to a cut off voltage of 0.9 volts. In separate tests batches of fresh button cells of this example were discharged at a constant rate of 90 milliAmp (equivalent to a rate of about 1 Amp in an AA size cell).

At discharge of 67 milliAmp, the capacity obtained at a cut off voltage of 0.9 Volts was 55.7 milliAmp-hrs. The specific capacity of the $AgCuO_2$ was 103 milliAmp-hours per gram. The energy output of the cell was 64.0 milliWatt-hrs.

At discharge of 90 milliAmp, the capacity obtained at a cut off voltage of 0.9 Volts was 55.2 milliAmp-hrs. The specific capacity of the $AgCuO_2$ was 102 milliAmp-hours per gram. The energy output of the cell was 63.5 milliWatt-hrs.

The performance results of the examples are summarized in Table 1 for discharge at 67 milliAmp and Table 2 for discharge at 90 milliAmp.

EXAMPLE 5

Test cylindrical button size cells 110 were prepared as in Example 1 except that the cathode 170 is formed of the following cathode mixture of the invention comprising silver copper oxide ($AgCuO_2$) and electrolytic manganese dioxide. The anode composition comprising gelled zinc was the same as used in Example 1. The cell was balanced so that the theoretical capacity of the zinc divided by the theoretical capacity of the total of $AgCuO_2$ and MnO2 was about 1. The cathode mixture had 0.54 grams of actives. The total weight percent of active material, namely 87 wt. %, was the same as in Example 1, however the percent by weight of $MnO_2$ was reduced to 72 wt. % and $AgCuO_2$ was added in amount of 15 wt. % to make up the difference.

| Cathode Composition[1] | |
|---|---|
| | Wt. % |
| $MnO_2$ | 72 |
| $AgCuO_2$ | 15 |

-continued

| Cathode Composition[1] | Wt. % |
|---|---|
| Expanded graphite (Timcal E-BNB90) | 7 |
| KOH aqueous Solution (36 wt % KOH and 2 wt. % ZnO) | 6 |
| | 100 |

Notes:
[1]Conversion to volume percent values can be made using the following real densities: $AgCuO_2$, 7.1 g/cc; expanded graphite (Timcal E-BNB90), 2.25 g/cc; and 36 wt % KOH aqueous solution, 1.35 g/cc.

The button cells 110 of this example were discharged at a constant rate of 67 milliAmp (equivalent to a rate of about 750 milliAmp in an AA size cell) to a cut off voltage of 0.9 volts. In separate tests batches of fresh button cells of this example were discharged at a constant rate of 90 milliAmp (equivalent to a rate of about 1 Amp in an AA size cell).

At discharge of 67 milliAmp, the capacity obtained at a cut off voltage of 0.9 Volts was 75.7 milliAmp-hrs. The specific capacity of the $AgCuO_2$ was 141 milliAmp-hours per gram. The energy output of the cell was 87.1 milliWatt-hrs.

At discharge of 90 milliAmp, the capacity obtained at a cut off voltage of 0.9 Volts was 66.1 milliAmp-hrs. The specific capacity of the $AgCuO_2$ was 123 milliAmp-hours per gram. The energy output of the cell was 76.0 milliWatt-hrs.

The performance results of the examples are summarized in Table 1 for discharge at 67 milliAmp (equivalent to 750 milliAmp discharge for AA cell) and Table 2 for discharge at 90 milliAmp (equivalent to 1 Amp discharge for AA cell).

TABLE 1

Button Alkaline Cell With Zinc Anode and Cathode Comprising Mixtures of $AgCuO_2$ and $MnO_2$ Discharged at 67 milliAmp to Cutoff at 0.9 Volt (Equiv. to 750 mAmp Discharge for AA Cell)

| Example | Cathode | Capacity, mAmp-hrs | Energy Out, mWatt-hrs | Specific Capacity for Total Cathode Active Material, mAmp-hrs/g |
|---|---|---|---|---|
| Ex. 1 Comparison | $MnO_2$ (EMD) and Expanded Graphite | 23.5 | 23.5 | 43 |
| Ex. 2 | $AgCuO_2$ (3 wt. %) plus $MnO_2$ and Expanded Graphite | 20.8 | 20.8 | 38 |
| Ex. 3 | $AgCuO_2$ (6 wt. %) plus $MnO_2$ and Expanded Graphite | 49.7 | 57.1 | 91 |
| Ex. 4 | AgCuO2 (10 wt. %) plus $MnO_2$ and Expanded Graphite | 55.7 | 64.0 | 103 |
| Ex. 5 | AgCuO2 (15 wt. %) plus MnO2 and Expanded graphite | 75.7 | 87.1 | 141 |

TABLE 2

Button Alkaline Cell With Zinc Anode and Cathode Comprising Mixtures of $AgCuO_2$ and $MnO_2$ Discharged at 90 milliAmp To cutoff at 0.9 Volt (Equiv. to 1 Amp Discharge for AA Cell)

| Example | Cathode | Capacity, mAmp-hrs | Energy Out, mWatt-hrs | Specific Capacity Cathode for Total Active Material, mAmp-hrs/g |
|---|---|---|---|---|
| Ex. 1 Comparison | $MnO_2$ (EMD) and Expanded Graphite | 27.4 | 27.4 | 50.0 |
| Ex. 2 | $AgCuO_2$ (3 wt. %) plus $MnO_2$ and Expanded Graphite | 18.1 | 18.1 | 33.0 |
| Ex. 3 | AgCuO2 (6 Wt. %) plus MnO2 and Expanded Graphite | 54.6 | 52.7 | 100.0 |
| Ex. 4 | $AgCuO_2$ (10 wt. %) plus MnO2 and Expanded Graphite | 55.2 | 63.5 | 102 |
| Ex. 5 | $AgCuO_2$ (15 wt. %) plus MnO2 and Expanded Graphite | 66.1 | 76.0 | 123 |

EXAMPLE 6

Test cylindrical button cells 110 were prepared as in Example 1 except that the cathode 170 is formed of the following cathode mixture of the invention comprising silver copper oxide (Ag2Cu2O3) and electrolytic manganese dioxide. The anode composition comprising gelled zinc was the same as used in Example 1. The cell was balanced so that the theoretical capacity of the zinc divided by the theoretical capacity of the total of Ag2Cu2O3 and MnO2 was about 1. The cathode mixture had about 0.4 grams actives. The total weight percent of active material, namely 87 wt. %, was the same as in Example 1, however the percent by weight of $MnO_2$ was reduced to 84 wt. % and Ag2Cu2O3 was added in amount of 3 wt. % to make up the difference.

| Cathode Composition[1] | Wt. % |
|---|---|
| $MnO_2$ | 84 |
| $Ag_2Cu_2O_3$ | 3 |
| Expanded graphite (Timcal E-BNB90) | 7 |
| KOH aqueous Solution (36 wt % KOH and 2 wt. % ZnO) | 6 |
| | 100 |

Notes:
[1]Conversion to volume percent values can be made using the following real densities: Ag2Cu2O3, 7.0 g/cc; expanded graphite (Timcal E-BNB90), 2.25 g/cc; and 36 wt % KOH aqueous solution, 1.35 g/cc.

The button cells 110 of this example were discharged at a constant rate of 67 milliAmp (equivalent to a rate of about 750 milliAmp in an AA size cell) to a cut off voltage of 0.9 volts. In separate tests batches of fresh button cells of this example were discharged at a constant rate of 90 milliAmp (equivalent to a rate of about 1 Amp in an AA size cell).

At discharge of 67 milliAmp, the capacity obtained at a cut off voltage of 0.9 Volts was 53.9 milliAmp-hrs. The specific capacity of the Ag2Cu2O3 was 154 milliAmp-hours per gram. The energy output of the cell was 65.4 milliWatt-hrs.

At discharge of 90 milliAmp, the capacity obtained at a cut off voltage of 0.9 Volts was 50.5 milliAmp-hrs. The specific capacity of the Ag2Cu2O3 was 116 milliAmp-hours per gram. The energy output of the cell was 61.4 milliWatt-hrs.

The performance results of the examples are summarized in Table 3 for discharge at 67 milliAmp and Table 4 for discharge at 90 milliAmp.

EXAMPLE 7

Test cylindrical size button cells 110 were prepared as in Example 1 except that the cathode 170 is formed of the following cathode mixture of the invention comprising silver copper oxide (Ag2Cu2O3) and electrolytic manganese dioxide. The anode composition comprising gelled zinc was the same as used in Example 1. The cell was balanced so that the theoretical capacity of the zinc divided by the theoretical capacity of the total of Ag2Cu2O3 and MnO2 was about 1. The cathode mixture had about 0.4 grams actives. The total weight percent of active material, namely 87 wt. %, was the same as in Example 1, however the percent by weight of $MnO_2$ was reduced to 81 wt. % and Ag2Cu2O3 was added in amount of 6 wt. % to make up the difference.

| Cathode Composition[1] | Wt. % |
|---|---|
| $MnO_2$ | 81 |
| $Ag_2Cu_2O_3$ | 6 |
| Expanded graphite (Timcal E-BNB90) | 7 |
| KOH aqueous Solution (36 wt % KOH and 2 wt. % ZnO) | 6 |
| | 100 |

Notes:
[1]Conversion to volume percent values can be made using the following real densities: Ag2Cu2O3, 7.0 g/cc; expanded graphite (Timcal E-BNB90), 2.25 g/cc; and 36 wt % KOH aqueous solution, 1.35 g/cc.

The button cells 110 of this example were discharged at a constant rate of 67 milliAmp (equivalent to a rate of about 750 milliAmp in an AA size cell) to a cut off voltage of 0.9 volts. In separate tests batches of fresh button cells of this example were discharged at a constant rate of 90 milliAmp (equivalent to a rate of about 1 Amp in an AA size cell).

At discharge of 67 milliAmp, the capacity obtained at a cut off voltage of 0.9 Volts was 57.8 milliAmp-hrs. The specific capacity of the $Ag_2Cu_2O_3$ was 158 milliAmp-hours per gram. The energy output of the cell was 70.2 milliWatt-hrs.

At discharge of 90 Amp, the capacity obtained at a cut off voltage of 0.9 Volts was 53.0 milliAmp-hrs. The specific capacity of the $Ag_2Cu_2O_3$ was 120 milliAmp-hours per gram. The energy output of the cell was 62.5 milliWatt-hrs.

The performance results of the examples are summarized in Table 3 for discharge at 67 milliAmp and Table 4 for discharge at 90 Amp.

EXAMPLE 8

Test cylindrical size button cells 110 were prepared as in Example 1 except that the cathode 170 is formed of the following cathode mixture of the invention comprising silver copper oxide (Ag2Cu2O3) and electrolytic manganese dioxide. The anode composition comprising gelled zinc was the same as used in Example 1. The cell was balanced so that the theoretical capacity of the zinc divided by the theoretical capacity of the total of $Ag_2Cu_2O_3$ and $MnO_2$ was about 1. The cathode mixture had about 0.4 grams actives. The total weight percent of active material, namely 87 wt. %, was the same as in Example 1, however the percent by weight of $MnO_2$ was reduced to 77 wt. % and Ag2Cu2O3 was added in amount of 10 wt. % to make up the difference.

| Cathode Composition[1] | Wt. % |
|---|---|
| $MnO_2$ | 77 |
| $Ag_2Cu_2O_3$ | 10 |

-continued

| Cathode Composition[1] | |
|---|---|
| | Wt. % |
| Expanded graphite (Timcal E-BNB90) | 7 |
| KOH aqueous Solution (36 wt % KOH and 2 wt. % ZnO) | 6 |
| | 100 |

Notes:
[1]Conversion to volume percent values can be made using the following real densities: $Ag_2Cu_2O_3$, 7.0 9/cc; expanded graphite (Timcal E-BNB90), 2.25 g/cc; and 36 wt % KOH aqueous solution, 1.35 g/cc.

The button cells 110 of this example were discharged at a constant rate of 67 milliAmp (equivalent to a rate of about 750 milliAmp in an AA size cell) to a cut off voltage of 0.9 volts. In separate tests batches of fresh button cells of this example were discharged at a constant rate of 90 milliAmp (equivalent to a rate of about 1 Amp in an AA size cell).

At discharge of 67 milliAmp, the capacity obtained at a cut off voltage of 0.9 Volts was 55.8 milliAmp-hrs. The specific capacity of the $Ag_2Cu_2O_3$ was 159 milliAmp-hours per gram. The energy output of the cell was 67.2 milliWatt-hrs.

At discharge of 90 milliAmp, the capacity obtained at a cut off voltage of 0.9 Volts was 55.1 milliAmp-hrs. The specific capacity of the $Ag_2Cu_2O_3$ was 126 milliAmp-hours per gram. The energy output of the cell was 64.8 milliWatt-hrs.

The performance results of the examples are summarized in Table 3 for discharge at 67 milliAmp and Table 4 for discharge at 90 milliAmp.

EXAMPLE 9

Test cylindrical button size cells 110 were prepared as in Example 1 except that the cathode 170 is formed of the following cathode mixture of the invention comprising silver copper oxide ($Ag_2Cu_2O_3$) and electrolytic manganese dioxide. The anode composition comprising gelled zinc was the same as used in Example 1. The cell was balanced so that the theoretical capacity of the zinc divided by the theoretical capacity of the total of $Ag_2Cu_2O_3$ and $MnO_2$ was about 1. The cathode mixture had about 0.4 grams actives. The total weight percent of active material, namely 87 wt. %, was the same as in Example 1, however the percent by weight of $MnO_2$ was reduced to 72 wt. % and $Ag_2Cu_2O_3$ was added in amount of 15 wt. % to make up the difference.

| Cathode Composition[1] | |
|---|---|
| | Wt. % |
| $MnO_2$ | 72 |
| $Ag_2Cu_2O_3$ | 15 |
| Expanded graphite (Timcal E-BNB90) | 7 |
| KOH aqueous Solution (36 wt % KOH and 2 wt. % ZnO) | 6 |
| | 100 |

Notes:
[1]Conversion to volume percent values can be made using the following real densities: $Ag_2Cu_2O_3$, 7.0 g/cc; expanded graphite (Timcal E-BNB90), 2.25 g/cc; and 36 wt % KOH aqueous solution, 1.35 g/cc.

The button cells 110 of this example were discharged at a constant rate of 67 milliAmp (equivalent to a rate of about 750 milliAmp in an AA size cell) to a cut off voltage of 0.9 volts. In separate tests batches of fresh button cells of this example were discharged at a constant rate of 90 milliAmp (equivalent to a rate of about 1 Amp in an AA size cell).

At discharge of 67 milliAmp, the capacity obtained at a cut off voltage of 0.9 Volts was 57.6 milliAmp-hrs. The specific capacity of the $Ag_2Cu_2O_3$ was 161 milliAmp-hours per gram. The energy output of the cell was 69.4 milliWatt-hrs.

At discharge of 90 milliAmp, the capacity obtained at a cut off voltage of 0.9 Volts was 56.9 milliAmp-hrs. The specific capacity of the Ag2Cu2O3 was 133 milliAmp-hours per gram. The energy output of the cell was 66.8 milliWatt-hrs.

The performance results of the examples are summarized in Table 3 for discharge at 67 milliAmp (equivalent to 750 mAmp discharge for AA cell) and Table 4 for discharge at 90 milliAmp (equivalent to 1 Amp discharge for AA cell.

TABLE 3

Button Alkaline Cell With Zinc Anode and Cathode Comprising Mixtures of $Ag_2Cu_2O_3$ and $MnO_2$ Discharged at 67 milliAmp to Cutoff at 0.9 Volts (Equiv. to 750 mAmp Discharge for AA cell)

| Example | Cathode | Capacity, mAmp-hrs | Energy Out, mWatt-hrs | Specific Capacity for Total Cathode Active Material, mAmp-hrs/g |
|---|---|---|---|---|
| Ex. 1 Comparison | $MnO_2$ (EMD) and Expanded Graphite | 23.5 | 23.5 | 43 |
| Ex. 6 | $Ag_2Cu_2O_3$ (3 wt. %) plus $MnO_2$ and Expanded Graphite | 53.9 | 65.4 | 154 |
| Ex. 7 | $Ag_2Cu_2O_3$ (6 wt. %) plus $MnO_2$ and Expanded Graphite | 57.8 | 70.2 | 158 |
| Ex. 8 | $Ag_2Cu_2O_3$ (10 wt. %) plus $MnO_2$ and Expanded Graphite | 55.8 | 67.2 | 159 |

TABLE 3-continued

Button Alkaline Cell With Zinc Anode and
Cathode Comprising Mixtures of $Ag_2Cu_2O_3$ and
$MnO_2$ Discharged at 67 milliAmp to Cutoff at
0.9 Volts (Equiv. to 750 mAmp Discharge for
AA cell)

| Example | Cathode | Capacity, mAmp-hrs | Energy Out, mWatt-hrs | Specific Capacity for Total Cathode Active Material, mAmp-hrs/g |
|---|---|---|---|---|
| Ex. 9 | $Ag_2Cu_2O_3$ (15 wt. %) plus MnO2 and Expanded graphite | 57.6 | 69.4 | 161 |

TABLE 4

Button Alkaline Cell With Zinc Anode
and Cathode Comprising Mixtures of
$Ag_2Cu_2O_3$ and $MnO_2$ Discharged at 90 milliAmp
To Cutoff at 0.9 Volts (Equiv. to 1 Amp
Discharge for AA Cell)

| Example | Cathode | Capacity, mAmp-hrs | Energy Out, mWatt-hrs | Specific Capacity Cathode for Total Active Material, mAmp-hrs/g |
|---|---|---|---|---|
| Ex. 1 Comparison | $MnO_2$ (EMD) and Expanded Graphite | 27.4 | 27.4 | 50 |
| Ex. 6 | $Ag_2Cu_2O_3$ (3 wt. %) plus $MnO_2$ and Expanded Graphite | 50.5 | 61.4 | 116 |
| Ex. 7 | $Ag_2Cu_2O_3$ (6 Wt. %) plus MnO2 and Expanded Graphite | 53.0 | 62.5 | 120 |
| Ex. 8 | $Ag_2Cu_2O_3$ (10 wt. %) plus MnO2 and Expanded Graphite | 55.1 | 64.8 | 126 |
| Ex. 9 | $Ag_2Cu_2O_3$ (15 wt. %) plus MnO2 and Expanded Graphite | 56.9 | 66.8 | 133 |

As shown in Tables 1 and 3 the alkaline cells of the invention with cathode active material comprising mixtures of $AgCuO_2$ and $MnO_2$ (Table 1, Examples 2–5) or mixtures of $Ag_2Cu_2O_3$ and $MnO_2$ (Table 3, Examples 6–9) all discharged at 67 milliAmp generally exhibits a higher capacity and higher power output than the same size conventional $Zn/MnO_2$ alkaline cell discharged at same rate. This is generally true except for Example 2 (Table 1) wherein the $AgCuO_2$ is present in the cathode in very low amount, i.e. 3 percent by weight.

Also as shown in the Tables 2 and 4 the alkaline cells of the invention with cathode active material comprising mixtures of $AgCuO_2$ and $MnO_2$ (Table 2, Examples 2–5) or mixtures of $Ag_2Cu_2O_3$ and $MnO_2$ (Table 4, Examples 6–9) all discharged at the higher rate of 90 milliAmp generally exhibits a higher capacity and higher power output than the same size conventional $Zn/MnO_2$ alkaline cell discharged at same rate. This is generally true except for Example 2 (Table 2) wherein the $AgCuO_2$ is present in the cathode in very low amount, i.e., 3 percent by weight.

Although the invention has been described with respect to specific embodiments, it will be appreciated that variations are possible within the concept of the invention. Thus, the invention is not intended to be limited to the specific embodiments herein described, but is better defined by the claims and equivalents thereof.

What is claimed is:

1. An electrochemical cell comprising an anode comprising anode active material, an aqueous alkaline electrolyte solution, a separator, and a cathode comprising a cathode active material comprising a mixture of manganese dioxide and a silver copper oxide selected from the group consisting of $AgCuO_2$, $Ag_2Cu_2O_3$ and mixtures thereof.

2. The cell of claim 1 wherein said cell is nonrechargeable.

3. The cell of claim 1 wherein the anode active material comprises zinc.

4. The cell of claim 1 wherein the electrolyte solution comprises potassium hydroxide.

5. The cell of claim 1 wherein said silver copper oxide comprises between about 3 and 15 percent by weight of said cathode.

6. The cell of claim 1 wherein the cathode further comprises graphitic carbon.

7. The cell of claim 6 wherein the graphitic carbon comprises expanded graphite.

8. The cell of claim 6 wherein the graphitic carbon comprises graphitic carbon nanofibers having a diameter less than 500 nanometers.

9. The cell of claim 8 wherein said carbon nanofibers have a mean average diameter between about 50 and 300 nanometers.

10. The cell of claim 9 wherein said carbon nanofibers have a mean average length between about 0.5 and 300 micron.

11. The cell of claim 6 wherein the graphitic carbon comprises between 4 and 10 percent by weight of the cathode.

12. The cell of claim 1 wherein the cathode comprises between about 82 and 90 percent by weight of said silver copper oxide.

13. The cell of claim 1 wherein the silver copper oxide is in particulate form having an average particle size between about 1 and 100 micron.

14. The cell of claim 1 wherein said cell comprises less than 50 parts by weight mercury per million parts total cell weight.

15. The cell of claim 8 wherein the graphitic carbon nanofibers comprise less than 200 parts by weight metal per million parts carbon.

16. An electrochemical cell comprising an anode comprising anode active material, an aqueous alkaline electrolyte solution, a separator, and a cathode comprising $AgCuO_2$ and $MnO_2$.

17. The cell of claim 16 wherein said cell is nonrechargeable.

18. The electrochemical cell of claim 16 wherein the anode active material comprises zinc.

19. The cell of claim 16 wherein said $AgCuO_2$ comprises between about 3 and 15 percent by weight of said cathode.

20. The cell of claim 16 wherein the electrolyte solution comprises potassium hydroxide.

21. The cell of claim 16 wherein said cathode further comprises expanded graphite.

22. The cell of claim 21 wherein said expanded graphite comprises between 4 and 10 percent by weight of said cathode.

23. The cell of claim 16 wherein said cell comprises less than 50 parts by weight mercury per million parts total cell weight.

24. An electrochemical cell comprising an anode comprising anode active material, an aqueous alkaline electrolyte solution, a separator, and a cathode comprising $Ag_2Cu_2O_3$ and $MnO_2$.

25. The cell of claim 24 wherein said cell is nonrechargeable.

26. The electrochemical cell of claim 24 wherein the anode active material comprises zinc.

27. The cell of claim 24 wherein said $Ag_2Cu_2O_3$ comprises between about 3 and 15 percent by weight of said cathode.

28. The cell of claim 24 wherein the electrolyte solution comprises potassium hydroxide.

29. The cell of claim 24 wherein said cathode further comprises expanded graphite.

30. The cell of claim 29 wherein said expanded graphite comprises between 4 and 10 percent by weight of said cathode.

31. The cell of claim 24 wherein said cell comprises less than 50 parts by weight mercury per million parts total cell weight.

* * * * *